United States Patent [19]

Gestaut et al.

[11] 4,382,904
[45] May 10, 1983

[54] ELECTRODE BACKING LAYER AND METHOD OF PREPARING

[75] Inventors: Lawrence J. Gestaut, Painesville, Ohio; Frank Solomon, Great Neck, N.Y.

[73] Assignee: Diamond Shamrock Corporation, Dallas, Tex.

[21] Appl. No.: 202,582

[22] Filed: Oct. 31, 1980

[51] Int. Cl.$^3$ .............................................. B29D 27/00
[52] U.S. Cl. .................................. 264/49; 204/290 R; 264/122
[58] Field of Search .......................... 264/49, 122, 127; 204/290

[56] References Cited

U.S. PATENT DOCUMENTS

| | | | |
|---|---|---|---|
| 4,135,995 | 1/1979 | Welch | 204/98 |
| 4,153,661 | 5/1979 | Ree et al. | 264/127 X |
| 4,170,540 | 10/1979 | Lazarz et al. | 264/127 X |
| 4,194,040 | 3/1980 | Breton et al. | 264/127 X |

*Primary Examiner*—Philip E. Anderson
*Attorney, Agent, or Firm*—Woodrow W. Ban; John P. Hazzard

[57] ABSTRACT

This disclosure is directed to the preparation of cohesive, self-sustaining electrode backing layers by a method comprising mixing from about 20 to about 50 weight parts of polytetrafluoroethylene (PTFE) having a particle size ranging from 0.05 to 0.5 micron with from about 50 to about 80 weight parts of a partially fluorinated carbon black of the formula $CF_x$, where x is from about 0.1 to about 0.18 and having particles of a size ranging from about 50 to about 3000 angstroms to produce an electrode backing layer having a combination of enhanced electrical conductivity and hydrophobicity.

9 Claims, No Drawings

ELECTRODE BACKING LAYER AND METHOD OF PREPARING

BACKGROUND OF THE INVENTION

In the field of electrochemistry there is a well-known electrochemical cell known as a chlor-alkali cell. In this cell, an electric current is passed through a saturated brine (sodium chloride salt) solution to produce chlorine gas and caustic soda (sodium hydroxide). A large portion of the chlorine and caustic soda for the chemical and plastics industries are produced in chloralkali cells.

Such cells are divided by a separator into anode and cathode compartments. The separator characteristically can be a substantially hydraulically impermeable membrane, e.g., a hydraulically impermeable cation exchange membrane, such as the commercially available NAFION ® manufactured by the E.I. du Pont de Nemours & Company. Alternatively, the separator can be a porous diaphragm, e.g, asbestos, which can be in the form of vacuum deposited fibers or asbestos paper sheet as are well known in the art. The anode can be a valve metal, e.g., titanium, provided with a nobel metal coating to yield what is known in the art as a dimensionally stable anode.

One of the unwanted byproducts present in a chlor-alkali cell is hydrogen which forms at the cell cathode. This hydrogen increases the power requirement for the overall electrochemical process, and eliminating its formation is one of the desired results in chlor-alkali cell operation.

It has been estimated that 25 percent of the electrical energy required to operate a chlor-alkali cell is utilized due to the formation of hydrogen at the cathode. Hence, the prevention of hydrogen formation, e.g., by reacting water with oxygen at the cathode resulting in the formation of hydroxide, can lead to substantial savings in the cost of electricity required to operate the cell. In fairly recent attempts to achieve cost savings and energy savings in respect of operating chlor-alkali cells, attention has been directed to various forms of water are known as oxygen (air) cathodes. These cathodes prevent the formation of molecular hydrogen at the cathode and instead reduce oxygen to form hydroxyl ions. Savings in cost for electrical energy are thereby achieved.

One known form of oxygen (air) cathode involves use of an active layer containing porous active carbon particles whose activity in promoting the formation of hydroxide may or may not be catalyzed (enhanced) using precious metal catalysts, such as silver, platinum, etc. Unfortunately, however, the pores of such active carbon particles may become flooded with the caustic soda thereby significantly reducing their ability to catalyze the reduction of oxygen at the air cathode and resulting in decreased operating efficiency. In an attempt to overcome these difficulties in flooding of the active carbon, hydrophobic materials, e.g., polytetrafluoroethylene (PTFE), have been employed in particulate or fibrillated (greatly attenuated and elongated) form to impart hydrophobicity to the active carbon layer, per se, and/or to a protective (wetproofing) or backing sheet which can be laminated or otherwise attached to the active layer. Thus, PTFE has been employed in both active layers and in backing (wetproofing) layers secured thereto. Such active carbon-containing layers, however, are subjected to loss of strength resulting in failure combined with blistering thereof when the chlor-alkali cell is operated at high current densities, viz., current densities of about 250 milliamperes/cm$^2$ and higher for prolonged time periods.

It is customary to employ porous carbon particles (with or without precious metal catalyst depositing thereon) as the active catalyst material in the so-called active layer of electrodes utilized in such a chlor-alkali cell. One problem which has been encountered in the use of catalyzed or uncatalyzed porous carbon particles in the active layer is that they tend to become wetted by (and therefore have their catalytic activity severly diminished by) the catholyte liquor, viz., the caustic soda (sodium hydroxide). Various attempts have been made to solve this wettability problem. By providing a backing layer which is porous and hydrophobic, wetting of the back of the active layer by caustic soda may be prevented thus allowing continuous access of oxygen to the active layer. Various forms of polytetrafluoroethylene (PTFE) have been utilized for such an electrode backing. PTFE, however, is not electrically conductive precluding electrically contacting the active layer through the hydrophobic PTFE porous backing layer.

FIELD OF THE INVENTION

The primary field to which this invention is directed is the preparation of an electrically conductive yet hydrophobic backing layer which can be used in direct association with an active carbon particle-containing active layer which serves as a component of an oxygen (air) cathode in a chlor-alkali cell or a cell wherein an electrochemical reaction takes place, e.g., fuel cell, nickel-air battery, etc.

PRIOR ART

U.S. Pat. No. 3,385,780 to I-Ming Feng discloses a thin, porous electrode consisting of a thin layer of a polytetrafluoroethylene pressed against a thin layer of polytetrafluoroethylene containing finely divided platinized carbon, the platinum being present in amounts of 1.2 to b 0.1 milligrams per square centimeter in the electrically conductive face of the thin electrode, viz., the side containing the platinized carbon, viz., the active layer. A thermally decomposable filler material can be used, or the filler can be a material capable of being leached out by either a strong base or an acid. It will be apparent that the backing layer in the Ming Feng patent is polytetrafluoroethylene, per se. Such a layer is not conductive. While U.S. Pat. No. 3,385,780 mentions a single unit electrode involving finely divided carbon in mixture with PTFE in the single layer, there is no specific disclosure of using carbon black which has been partially fluorinated, nor is there any disclosure of using partially fluorinated particulate carbon or the use of a conductive backing layer for any purpose, whatsoever.

U.S. Pat. No. 4,135,995 to Cletus N. Welch is directed to a cathode having a hydrophilic portion formed of a solid intercalation compound of fluorine and carbon of the emperical formula $CF_x$, where x ranges from about 0.25 to 1 and preferably ranges from about 0.25 to about 0.7. The intercalation compounds of carbon and fluorine are referred to as hydrophilic, fluorinated graphites and graphite fluorides characterized by an infrared spectrum showing an absorption banned at 1220 centimeters$^{-1}$. A layer of hydrophobic material such as polyperfluoroethylene (polytetrafluoroethylene) can be utilized in a hydrophobic portion of the same layer or it can be utilized in the form of a different layer which can be associated with a current carrier layer. The Welch cathode may be utilized as an air (oxygen) cathode.

The present invention is readily distinguishable from that of the Welch patent in the following significant respects. First, the partially fluorinated compounds utilized in accordance with this invention are carbon blacks of the formula $CF_x$, wherein $x$ ranges from 0.1 to about 0.18. Hence, the extent of fluorination is markedly less in these partially fluorinated compounds as compared with those disclosed by Welch. Secondly, these compounds are hydrophobic and characterized by greater hydrophobicity after partial fluorination than before. Thirdly, it will be observed that the Welch intercalation compounds are fluorinated graphites or graphite fluorides. The partially fluorinated compounds used herein are partially fluroinated carbon blacks. Carbon blacks show significant differences when compared with graphitic blacks and active carbons due to their respective structure.

DESCRIPTION OF THE INVENTION

The present invention contemplates the use of carbon black as defined in an article entitled "FUNDAMENTALS OF CARBON BLACK TECHNOLOGY" by Frank Spinelli appearing in the *AMERICAN INK MAKER*, August, 1970. Carbon black is generic term referring to a family of industrial carbons which includes lampblacks, channel blacks, furnace blacks and thermal blacks. In general, carbon black is made by incomplete combustion or thermal decomposition of a liquid or gaseous hydrocarbon. A preferred class of carbon blacks are the acetylene carbon blacks, e.g., made from acetylene by continuous thermal decomposition, explosion, by combustion in an oxygen-deficient atmosphere, or by various electrical processes. Characteristically, these acetylene blacks contain 99.5+ weight percent carbon and have a particle size ranging from about 50 to about 2000 angstrom units. The density of the acetylene black material is approximately 1.95 grams per cubic centimeter. More preferably, the acetylene black is a commercially available acetylene black known by the designation "Shawinigan Black" and has an average particle size of about 425 Angstroms. Such acetylene blacks are somewhat hydrophobic, e.g., as demonstrated by the fact that the particles thereof float on cold water but quickly sink in hot water.

The hydrophobic electroconductive electrode backing layers were prepared in accordance with this invention by combining the PTFE in particulate form as a dispersion with the acetylene black particles as described above. According to a preferred embodiment of this invention, the acetylene black employed is that having an average particle size of approximately 425 Angstrom units with a standard deviation of 250 Angstom units. The range of particle size is from about 50 to about 2000 Angstroms.

Partially fluorinated "Shawinigan Black" was purchased from MarChem, Inc. of Houston, Tex. These partially fluorinated acetylene blacks are compounds of the formula $CF_x$, where $x$ ranges from 0.1 to about 0.18.

The hydrophobicity of the already hydrophobic carbon black particles is enhanced by the partial fluorination as was observed from comparative experiments wherein unfluorinated acetylene black particles floated on cold water but quickly sank in hot water versus the partially fluorinated acetylene blacks, fluorinated to the extent of $x$ being about 0.1 to about 0.18, which floated on hot water virtually indefinitely and could not be made to pierce the meniscus of the water.

Hydrophobic electroconductive electrode backing (wetproofing) layers were prepared in accordance with this invention by combining the PTFE in particulate form as a dispersion with the partially fluorinated carbon black particles described above.

Partially fluorinated "Shawinigan Black" (acetylene carbon black), $CF_{0.1\ to\ 0.18}$, was suspended in isopropyl alcohol and placed in an ultrasonic generator. Gradually a dilute aqueous dispersion of PTFE (du Pont's TEFLON 30), containing 2 weight percent PTFE, was added thereto polytetrafluoroethylenate the $CF_{0.1\ to\ 0.18}$ particles, viz., form an intimate mixture thereof. The PTFE/$CF_{0.1\ to\ 0.18}$ mix was then filtered, dried, treated to remove the PTFE wetting gent (by heating at 300° C. for 20 minutes in air or extracting it with chloroform) briefly chopped to form a granular mix and then fabricated into sheet form either by (a) passing between heated rollers (65° to 90° C.), or (b) by dispersion of said PTFE/$CF_x=0.1$ to 0.18 particles in a liquid dispersion medium capable of wetting said particles and filtration on a salt (NaCl) bed previously deposited on filter paper or like filtration media, or (c) by spraying the $CF_{0.1\ to\ 0.18}$/PTFE mix in a mixture of water and alcohol, e.g., isopropyl alcohol, on an electrode active layer/current distributor composite assembly and drying to yield a fine-pore wetproofing layer. The polytetrafluoroethylenate mix can contain from about 50 to 80 weight percent $CF_x$ 0.1 to 0.18 and about 20 to 50 weight percent PTFE.

In any case, a pore-former can be incorporated into the $CF_{0.1\ to\ 0.18}$/PTFE mix prior to forming the wetproofing layer or sheet. The pore-former can be of the soluble type, e.g., sodium carbonate or the like, or the volatile type, e.g., ammonium benzoate or the like. The use of ammonium benzoate as a fugitive, volatile pore-former is described and claimed in U.S. patent application Ser. No. 202,583, filed in the name of Frank Solomon of even date herewith. The disclosure of this application is incorporated herein by reference.

Whether the wetproofing sheet is formed by rolling, filtration or spraying, the pore-former can be removed by washing (if a soluble one) or heating (if a volatile one) either prior to laminating the wetproofing layer to the current distributor and active layer, or after lamination thereof. In cases where a soluble pore-former is used, the laminate is preferably given a hot 50° to about 100° C. soak in an alkylene polyol, e.g., ethylene glycol or the like, prior to water washing for 10 to 60 minutes. The ethylene glycol hot soak imparts enhanced resistance of such laminated electrodes to blistering during water washing and is the subject matter described and claimed in U.S. patent application Ser. No. 202,583 entitled "Electrode Layer Treating Process" and filed of even date herewith in the name of Frank Solomon. The disclosure of this application is incorporated herein by reference.

When the wetproofing layer is formed by filtration, it can be released from the filter media by washing with water to dissolve the salt bed, drying and pressing lightly to consolidate same, followed by laminating to the current distributor and active layer. Alternatively, the filter paper/salt/wetproofing layer assembly can be laminated to the current distributor and active layer (with the filter paper side away from the current distributor and the wetproofing layer side in contact with the current distributor) followed by dissolving the salt away.

The testing of the electroconductive, hydrophobic backing layers of this invention in the corrosive environment of use of a chlor-alkali cell has revealed a desirable combination of electroconductivity with balanced hydrophobicity and said layer is believed to have achieved a desired result in the oxygen (air) cathode field.

The invention will be further illustrated in the examples which follow in which parts, percents and ratios are by weight unless otherwise indicated.

EXAMPLE 1

(Preparation of PTFE/SBF$_{0.17}$)

One and one-half (1.5) grams of partially fluorinated "Shawinigan Black" (fluorinated to the level where x=0.17), hereinafter referred to as SBF$_{0.17}$, were suspended in 30 mls of isopropyl alcohol and placed in a small ultrasonic bath (Model 250, RAI Inc.) where it was simultaneously stirred and ultrasonically agitated.

Sixty-eight one hundredths (0.68) ml of du Pont TEFLON 30 aqueous PTFE dispersion was diluted with 20 mls of water and added dropwise from a separatory funnel to the SBF$_{0.17}$ dispersion gradually, over approximately a 10-minute period with stirring, followed by further stirring for approximately one hour. This material was then filtered, washed with water and dried at 110° C.

EXAMPLE 2

(PTFE/SBF$_{0.17}$ Wetproofing Layer by Filtration Method)

A PTFE/SBF$_{0.17}$ conductive, hydrophobic wetproofing layer or sheet was prepared by the filtration method as follows: two hundred twenty five (225) milligrams of the PTFE/SBF$_{0.17}$ mix, prepared in accordance with Example 1, were chopped in a small high speed coffee grinder (Varco Model 228-1, made in France) for about 30 to 60 seconds and then dispersed in 250 mls of isopropyl alcohol in a Waring Blender. This dispersion was then filtered onto a "salt paper," viz., NaCl on filter paper, of 19 cm$^2$ area to form a cohesive, self-sustaining wetproofing layer having an area density of 10.6 mg/cm$^2$.

Resistivity of this wetproofing layer was measured and found to be 8.8 ohm-centimeters.

Separately a control wetproofing layer test strip was formed using unfluorinated "Shawinigan Black," and is resistivity was measured and found to be 0.53 ohm-cm. The resistivity of pure PTFE (from TEFLON 30) is greater than 10$^{15}$ ohm-cm by way of comparison.

Although the resistivity of the PTFE/SBF$_{0.17}$ wetproofing layer is about 16.6 times that of the unfluorinated SB carbon black, it is still low enough to be useful in forming electrodes when in intimate contact with a current distributor.

Permeability is an important factor in high current density operation of a gas electrode having hydrophobic (conductive or nonconductive) backing, viz., a wetproofing or liquid barrier layer.

The wetproofing layers of this invention have adequate permeability comparable to that of pure PTFE backings (even when pressed at up to 5 tons/in$^2$) yet have far superior electroconductivity.

Although in accordance with this invention, the laminated electrodes are usually made with the PTFE/CF$_{0.1\ to\ 0.18}$ backing layer laminated to the active layer with he current distributor on the active layer side; since said backing layers are electroconductive, the current distributor can be laminated on the backing layer side.

The extent of fluorination of the CF$_x$=0.1 to 0.18 material can be determined in accordance with known analytical procedures. For example, the sample can be subjected to combustion and then either titrated with thorium nitrate in the presence of an indicator, or a fluoride-sensitive electrode can be used.

What is claimed is:

1. A method for preparing an electrically conductive, hydrophobic, cohesive, self-sustaining electrode wetproofing sheet for use with an oxygen cathode comprising the steps of:
   intimately mixing from about 50 to about 80 wt. percent partially fluorinated carbon black particles of the formula CF$_x$, where x is from 0.1 to 0.18, with from about 20 to about 50 wt. percent of liquid dispersed polytetrafluoroethylenated particles, to form a polytetrafluoroethylenated carbon black mix that can include a wetting agent;
   drying the polytetrafluoroethylenated carbon black mix,
   removing any wetting agent associated with forming the polytetrafluoroethylenated carbon black mix;
   chopping the polytetrafluoroethylenated carbon mix to form a granular mix, and then
   forming the granular mix into a sheet by one of passing said granular mix through rollers heated to between about 65° C. and 90° C. and by dispersing said granular mix in a liquid dispersion medium capable of wetting said granular mix then filtering said granular mix from said dispersion on a salt bed-filter medium.

2. A method as in claim 1 wherein said carbon black is an acetylene carbon black.

3. A method as in claim 1 wherein a particulate pore-former is added to the polytetrafluoroethylene/CF$_x$=0.1 to 0.18 mix before formation of said layer or sheet.

4. A method as in claim 3 wherein said pore-former is a soluble pore-former.

5. A method as in claim 4 wherein said soluble pore-former is sodium carbonate.

6. A method as in claim 3 wherein said pore-former is a volatile pore-former.

7. A method as in claim 6 wherein said volatile pore-former is ammonium benzoate.

8. A method as in claim 1 wherein said wetproofing sheet is released from said salt bed-filter medium by washing said wetproofing layer on said salt bed-filter medium with a solvent for said salt, and then lightly pressing said sheet.

9. A method as in claim 8 wherein said soluble salt is sodium chloride and said solvent is water.

* * * * *